(12) United States Patent
Lee et al.

(10) Patent No.: US 11,308,569 B2
(45) Date of Patent: Apr. 19, 2022

(54) COMPUTER-IMPLEMENTED SYSTEMS AND METHODS FOR CENTRALIZED LOGICS MONITORING

(71) Applicant: COUPANG CORP., Seoul (KR)

(72) Inventors: Yulhee Lee, Seoul (KR); Youngshin Kang, Incheon (KR); Youngmin Ji, Gyeonggi-do (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/075,913

(22) Filed: Oct. 21, 2020

(65) Prior Publication Data

US 2021/0090195 A1    Mar. 25, 2021

Related U.S. Application Data

(63) Continuation of application No. 16/582,306, filed on Sep. 25, 2019, now Pat. No. 10,846,812.

(51) Int. Cl.
*G06Q 50/28* (2012.01)
*G06F 16/26* (2019.01)
*G06Q 10/06* (2012.01)

(52) U.S. Cl.
CPC .......... *G06Q 50/28* (2013.01); *G06F 16/26* (2019.01); *G06Q 10/06311* (2013.01); *G06Q 10/06393* (2013.01); *G06Q 10/06398* (2013.01)

(58) Field of Classification Search
CPC ............ G06Q 10/00–50/00; G06F 1/00–21/00

(Continued)

(56) References Cited

U.S. PATENT DOCUMENTS 8,548,838 B1    10/2013  Ganesan
8,869,053 B2 *  10/2014  Ehrler .................... G06Q 10/06
                                                         715/764

(Continued)

FOREIGN PATENT DOCUMENTS

CN          1938715 A       3/2007
CN        104412227 A       3/2015

(Continued)

OTHER PUBLICATIONS

Office Action from Taiwan Intellectual Property Office in counterpart application No. 109127518, dated Jan. 20, 2021 (4 pages).

(Continued)

*Primary Examiner* — Alan S Miller
(74) *Attorney, Agent, or Firm* — Finnegan, Henderson, Farabow, Garrett & Dunner LLP

(57) ABSTRACT

Disclosed embodiments provide systems and methods related to monitoring logistics. A method for monitoring logistics comprises capturing attendance data and timekeeping data for a first plurality of workers from a first management system, data identifying work performed by a second plurality of workers, the data comprising a location of performed work, an associated scan event, or clock-in information associated with each of a second plurality of workers, from a second management system, and work data related to a third plurality of workers from a third management system. The method further comprises consolidating the captured data on workers having corresponding data in one of the captured sets of data, receiving a request from a user device, for a visualization including analysis of the consolidated data, and providing a visualization to the user device, wherein the visualization is generated by analyzing the consolidated data.

18 Claims, 22 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 9,152,934 B2 | 10/2015 | Carlson et al. | |
| 9,833,197 B1* | 12/2017 | Elhawary | A61B 5/0022 |
| 10,043,146 B2* | 8/2018 | Khatravath | G06Q 10/1091 |
| 10,399,778 B1* | 9/2019 | Shekhawat | G06Q 10/087 |
| 10,467,565 B2* | 11/2019 | LaReau | G06Q 10/063114 |
| 2003/0071814 A1* | 4/2003 | Jou | G06F 9/542 |
| | | | 345/440 |
| 2005/0027466 A1* | 2/2005 | Steinmetz | H04M 1/24 |
| | | | 702/63 |
| 2005/0273381 A1* | 12/2005 | Thomas | G06Q 10/00 |
| | | | 705/7.42 |
| 2011/0302003 A1* | 12/2011 | Shirish | G06Q 10/0639 |
| | | | 705/7.38 |
| 2014/0025785 A1* | 1/2014 | Zahnow | G07C 1/10 |
| | | | 709/219 |
| 2014/0032279 A1 | 1/2014 | Zanichelli et al. | |
| 2014/0278629 A1* | 9/2014 | Stephenson | G06Q 10/1091 |
| | | | 705/7.13 |
| 2014/0278638 A1* | 9/2014 | Kreuzkamp | G06Q 10/06398 |
| | | | 705/7.15 |
| 2014/0278828 A1* | 9/2014 | Dorcas | G06Q 10/06398 |
| | | | 705/7.42 |
| 2015/0206081 A1* | 7/2015 | Lee | G06Q 10/06 |
| | | | 705/7.13 |
| 2015/0295877 A1* | 10/2015 | Roman | H04W 4/14 |
| | | | 709/203 |
| 2017/0278041 A1* | 9/2017 | Lareau | G06Q 10/063114 |
| 2019/0228379 A1 | 7/2019 | Shimada et al. | |
| 2019/0256290 A1* | 8/2019 | Hamilton | B65G 1/1375 |

FOREIGN PATENT DOCUMENTS

| | | |
|---|---|---|
| CN | 104850979 A | 8/2015 |
| JP | 2002-109002 A | 4/2002 |
| JP | 2003-104520 | 4/2003 |
| JP | 2004-272640 A | 9/2004 |
| JP | 2007-034856 A | 2/2007 |
| JP | 2008-242702 A | 10/2008 |
| JP | 2011-053829 | 3/2011 |
| JP | 2011-118773 | 6/2011 |
| JP | 2014-211766 A | 11/2014 |
| JP | 2015-032057 | 2/2015 |
| JP | 2018-169655 A | 11/2018 |
| JP | 2019-021014 | 2/2019 |
| KR | 10-2014-0144073 | 12/2014 |
| WO | WO 2016/079782 A1 | 5/2016 |
| WO | WO 2017/175259 A | 10/2017 |
| WO | WO 2019/105269 A | 6/2019 |

OTHER PUBLICATIONS

Written Opinion of the International Searching Authority for Application PCT/IB2020/057638, dated Nov. 17, 2020, (6 pages).
International Search Report for Application PCT/IB2020/057638, dated Nov. 17, 2020, (3 pages).
Korean Intellectual Property Office Notice of Preliminary Rejection for Application 10-2019-0148355, dated Dec. 4, 2020, (12 pages).
Notice of Reasons for Rejection in counterpart Japanese application 2020-565451, dated Oct. 12, 2021 (20 pages).
Hong Kong Office Action in counterpart Hong Kong Application No. 22020013871.1 dated Jan. 14, 2022 (4 pages).
Notice of Preliminary Rejection in counterpart Korean Patent Application No. 10-2021-0098087 dated Jan. 26, 2022 (12 pages).

* cited by examiner

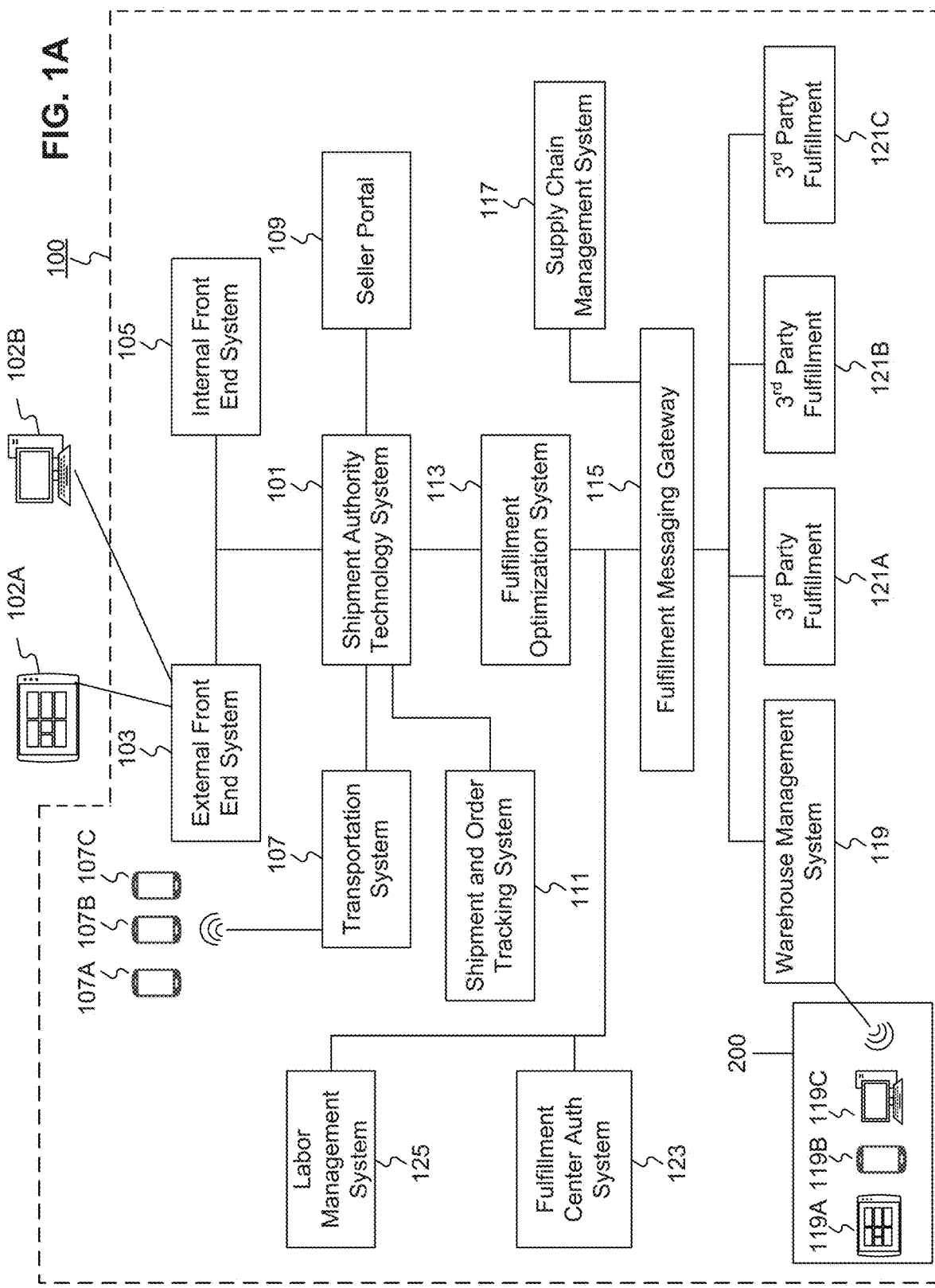

FIG. 5E

Work Process Log

FC4 ▽ | 2019-05-28 ~ 2019-05-28 | ALL ▽ | Worker ID | Search

Work Log

Spreadsheet Download

| Work Date | Employee | Task Start | Task End | UPH Start | UPH End | Work Type | Process(Task) | Unit Qty | Center Code | Location |
|---|---|---|---|---|---|---|---|---|---|---|
| 2019-05-28 | A(20054846) | 08:30 | 08:30 | 08:30 | 09:00 | | PUNCH_IN(PIN_SUBMITTED) | | INC4 | - |
| 2019-05-28 | A(20054846) | 09:00 | 09:00 | 09:00 | 09:00 | | PUNCH_IN(PIN_SUBMITTED) | | INC4 | - |
| 2019-05-28 | A(20054846) | 09:00 | 09:59 | 09:00 | 10:00 | OUTBOUND | PACK(PACKING) | 124 | INC4 | FnF_3_A07 |
| 2019-05-28 | A(20054846) | 10:00 | 10:06 | 10:00 | 10:07 | OUTBOUND | PACK(PACKING) | 26 | INC4 | FnF_3_A07 |
| 2019-05-28 | A(20054846) | 10:07 | 10:21 | 10:07 | 10:21 | OUTBOUND | PACK(PACKING) | 26 | INC4 | Single_3_A07 |
| 2019-05-28 | A(20054846) | 10:21 | 10:59 | 10:21 | 11:00 | OUTBOUND | PACK(PACKING) | 87 | INC4 | FnF_3_A07 |
| 2019-05-28 | A(20054846) | 11:00 | 11:19 | 11:00 | 11:26 | OUTBOUND | PACK(PACKING) | 16 | INC4 | FnF_3_A07 |
| 2019-05-28 | A(20054846) | 11:26 | 11:30 | 11:26 | 11:32 | OUTBOUND | PACK(PACKING) | 7 | INC4 | Single_3_A07 |

| MOS | End to End Report | | | | | | | | Auto-updat ⚫ ⚙ |
|---|---|---|---|---|---|---|---|---|---|

| 2019-05-28 📅 | Overnight,Sameday ˅ | Wave 1,Wave 2,Shift 1 ˅ | ASN_1,AYG_1,BSN_1,B ˅ | Delivery,Exchange,S ˅ | Search |
|---|---|---|---|---|---|

PDD Miss Detail *You can download the raw data when you click the red-colored number ⓘ

Expand All

| PDD Miss Reason1 | PDD Miss Reason2 | Miss Total (%) | D+0 2019-05-28 | D+1 2019-05-27 | D+2 2019-05-26 | D+3 2019-05-25 | D+4 2019-05-24 | D+5 2019-05-23 |
|---|---|---|---|---|---|---|---|---|
| ˅ CAMP_MISS | TOTAL | 24,490(33.8%) | 1,175 | 2,243 | 1,749 | 2,020 | 4,932 | 1,701 |
| | CAMP_LACK_OF_TIME | 582 (0.8%) | 0 | 3 | 0 | 0 | 538 | 3 |
| | CAMP_SIT_INVOICE_... | 7,408 (10.2%) | 111 | 821 | 803 | 874 | 856 | 831 |
| | CAMP_SIT_INVOICE_... | 656 (0.9%) | 2 | 66 | 50 | 50 | 229 | 56 |
| | CAMP_MISS_CLASSI... | 1,140 (1.6%) | 25 | 143 | 111 | 124 | 157 | 90 |
| | CAMP_NATURAL_DIS... | 2 (0.0%) | 0 | 1 | 0 | 0 | 0 | 0 |
| | LATE_WITHOUT_REA... | 14,704 (20.3%) | 1,037 | 1,209 | 785 | 972 | 3,152 | 721 |
| ˂ CUSTOMER | TOTAL | 27,622 (38.2%) | 1,305 | 2,875 | 2,957 | 3,616 | 2,927 | 2,713 |
| | TOTAL | 6,970 (9.6%) | 241 | 361 | 750 | 438 | 3,487 | 420 |

|  | Employee Type | Total Workers | Direct | | | | Indirect | | | | | |
|---|---|---|---|---|---|---|---|---|---|---|---|---|
|  |  |  | Picker | Rebiner | Packer | Total | Pick | Rebin | Pack | ICQA | Non Value | Total |
| FC 4 | Temp | 100(50%) | 10(10%) | 10(10%) | 15(7.5%) | 35(17.5%) | 5(2.5%) | 10(5%) | 10(5%) | 20(10%) | 20(10%) | 65(32.5%) |
|  | Perm | 100(50%) | 10(10%) | 10(10%) | 15(7.5%) | 35(17.5%) | 5(2.5%) | 10(5%) | 10(5%) | 20(10%) | 20(10%) | 65(32.5%) |
| FC 1 | Temp | 100(50%) | 10(10%) | 10(10%) | 15(7.5%) | 35(17.5%) | 5(2.5%) | 10(5%) | 10(5%) | 20(10%) | 20(10%) | 65(32.5%) |
|  | Perm | 100(50%) | 10(10%) | 10(10%) | 15(7.5%) | 35(17.5%) | 5(2.5%) | 10(5%) | 10(5%) | 20(10%) | 20(10%) | 65(32.5%) |
| FC 2 | Temp | 100(50%) | 10(10%) | 10(10%) | 15(7.5%) | 35(17.5%) | 5(2.5%) | 10(5%) | 10(5%) | 20(10%) | 20(10%) | 65(32.5%) |
|  | Perm | 100(50%) | 10(10%) | 10(10%) | 15(7.5%) | 35(17.5%) | 5(2.5%) | 10(5%) | 10(5%) | 20(10%) | 20(10%) | 65(32.5%) |
| Total | Temp | 300 (50%) | 30 (5%) | 30 (5%) | 45 (7.5%) | 105 (17.5%) | 15 (2.5%) | 30 (5%) | 30 (5%) | 60 (10%) | 60 (10%) | 195 (32.5%) |
|  | Perm | 300 (50%) | 30 (5%) | 30 (5%) | 45 (7.5%) | 105 (17.5%) | 15 (2.5%) | 30 (5%) | 30 (5%) | 60 (10%) | 60 (10%) | 195 (32.5%) |

560

Assigned Workers by Line

|  | ALL | Line 1 | Line 2 | Line 3 | Line 4 | Line 5 | Line 6 | Line 7 | Line 8 | Line 9 | Line 10 | Line 11 | Line 12 | Line 13 | Line 14 |
|---|---|---|---|---|---|---|---|---|---|---|---|---|---|---|---|
| Temp | 33 | 3 | 12 | 12 | 12 | 12 | 12 | 12 | 12 | 12 | 12 | 12 | 12 | 12 | 12 |
| Perm | 29 | 5 | 4 | 4 | 4 | 4 | 4 | 4 | 4 | 4 | 4 | 4 | 4 | 4 | 4 |
| Total | 70 | 10 | 17 | 17 | 17 | 17 | 17 | 17 | 17 | 17 | 17 | 17 | 17 | 17 | 17 |

Accumulated Gross UPH by Line

⚠ Under Target UPH
Line 1, 4, 5, 7, 8

Line 1 Line 2 Line 3 Line 4 Line 5 Line 6 Line 7 Line 8 Line 9 Line 10 Line 11 Line 12 Line 13 Line 14
Manager A   B   C   D   E   F   G   H   I   J   K   L   M   N

Pack UPH Summary

| Time | Total Direct Only | Line 1 W1/200 | Line 2 W2/200 | Line 3 W3/200 | Line 4 W4/200 | Line 5 W5/200 | Line 6 W6/200 | Line 7 W7/200 | Line 8 W8/200 | Line 9 W9/200 | Line 10 W10/200 | Line 11 W11/200 | Line 12 W12/200 | Line 13 W13/200 |
|---|---|---|---|---|---|---|---|---|---|---|---|---|---|---|
| Total | 200 | 80 | 200 | 200 | 200 | 200 | 200 | 200 | 200 | 200 | 200 | 200 | 200 | 200 |
| 08-09 | 200 | 200 | 200 | 200 | 200 | 200 | 200 | 200 | 200 | 200 | 80 | 200 | 200 | 200 |
| 09-10 | 200 | 200 | 80 | 200 | 200 | 200 | 200 | 80 | 200 | 200 | 200 | 200 | 200 | 200 |
| 10-11 | 200 | 200 | 200 | 200 | 200 | 80 | 200 | 200 | 200 | 200 | 200 | 200 | 200 | 200 |

570

Download Excel Doc.

FIG. 5M

COMPUTER-IMPLEMENTED SYSTEMS AND METHODS FOR CENTRALIZED LOGICS MONITORING

CROSS-REFERENCE TO RELATED APPLICATIONS

This application is a continuation of and claims the benefit of priority to U.S. application Ser. No. 16/582,306, filed Sep. 25, 2019 (now allowed), the contents of which are hereby incorporated herein by reference.

TECHNICAL FIELD

The present disclosure generally relates to computerized systems and methods for monitoring logistics. In particular, embodiments of the present disclosure relate to inventive and unconventional systems relate to computer-implemented systems, methods, and user interfaces for efficiently monitoring human labor in a location of a fulfillment center.

BACKGROUND

Many retailers that prepare and ship goods from warehouses rely on Lean Production and other methodologies to reduce waste in labor as much as possible while increasing speed, efficiency, and improving quality by monitoring human labor. Although currently existing warehouses and systems for monitoring human labor in such warehouses are configured to handle related processes efficiently, a common issue arises when the systems cannot identify underperforming workers or monitor every task occurring in warehouses.

To mitigate such problems, conventional systems receive data from various sources and presented the received data to a manager associated with a warehouse. While these systems attempt to monitor human labors in a FC, manual operations are required to manage workers' attendance and performance and determine statistics and other information from the received data. Moreover, data transmitted from various sources were in different standard of metrics and delay in data caused difficulties with users to easily perceive status of the FC.

Therefore, there is a need for improved methods and systems for monitoring logistics in a fulfillment center.

SUMMARY

One aspect of the present disclosure is directed to a method for monitoring logistics. The method may comprise operations. The operations comprise capturing, from a first management system, attendance data and timekeeping data for a first plurality of workers and capturing, from a second management system, data identifying work performed by a second plurality of workers. The data may comprise a location of performed work, an associated scan event, or clock-in information associated with each of a second plurality of workers. The operations further comprise capturing, from a third management system, work data related to a third plurality of workers, consolidating the captured data on workers having corresponding data in one of the captured sets of data, and receiving a first request for monitoring logistics from a user device based on a specific criteria such as an amount of use of each search, determining the amount of use of each search by the user device using a processor that tracks how much memory has been allocated to each search associated with a parameter over a predetermined time, automatically selecting the most used parameter to a first parameter based on the determined amount of use, consolidating the captured data on workers having corresponding data in one of the captured sets of data according to the selected first parameter; and providing a visualization to the user device, wherein the visualization is generated by analyzing the consolidated data.

Another aspect of the present disclosure is directed to a computer-implemented system for monitoring logistics. The computer implemented system may include one or more memory devices storing instructions. The computer-implemented system may also include one or more processors configured to execute the instructions to perform operations as discussed above.

Yet another aspect of the present disclosure is directed to a computer-implemented system for monitoring logistics. The computer implemented system may include one or more memory devices storing instructions. The computer-implemented system may also include one or more processors configured to execute the instructions to perform operations as discussed above. The operations further comprise providing a visualization to a user device, wherein the visualization includes a job distribution showing worker assignments on each allocated process based on the consolidated data.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for monitoring logistics. The disclosed embodiments provide innovative technical features that allow monitoring individual workers and a performance of each worker associated with a fulfillment center. For example, the disclosed embodiments enable capturing data associated with workers in fulfillment center from various management system, consolidating the captured data on workers having corresponding data in one of the captured sets of data, and efficiently providing a visualization analyzing status of a worker and the worker's performance to a user device in real-time.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
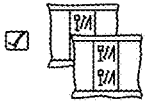
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
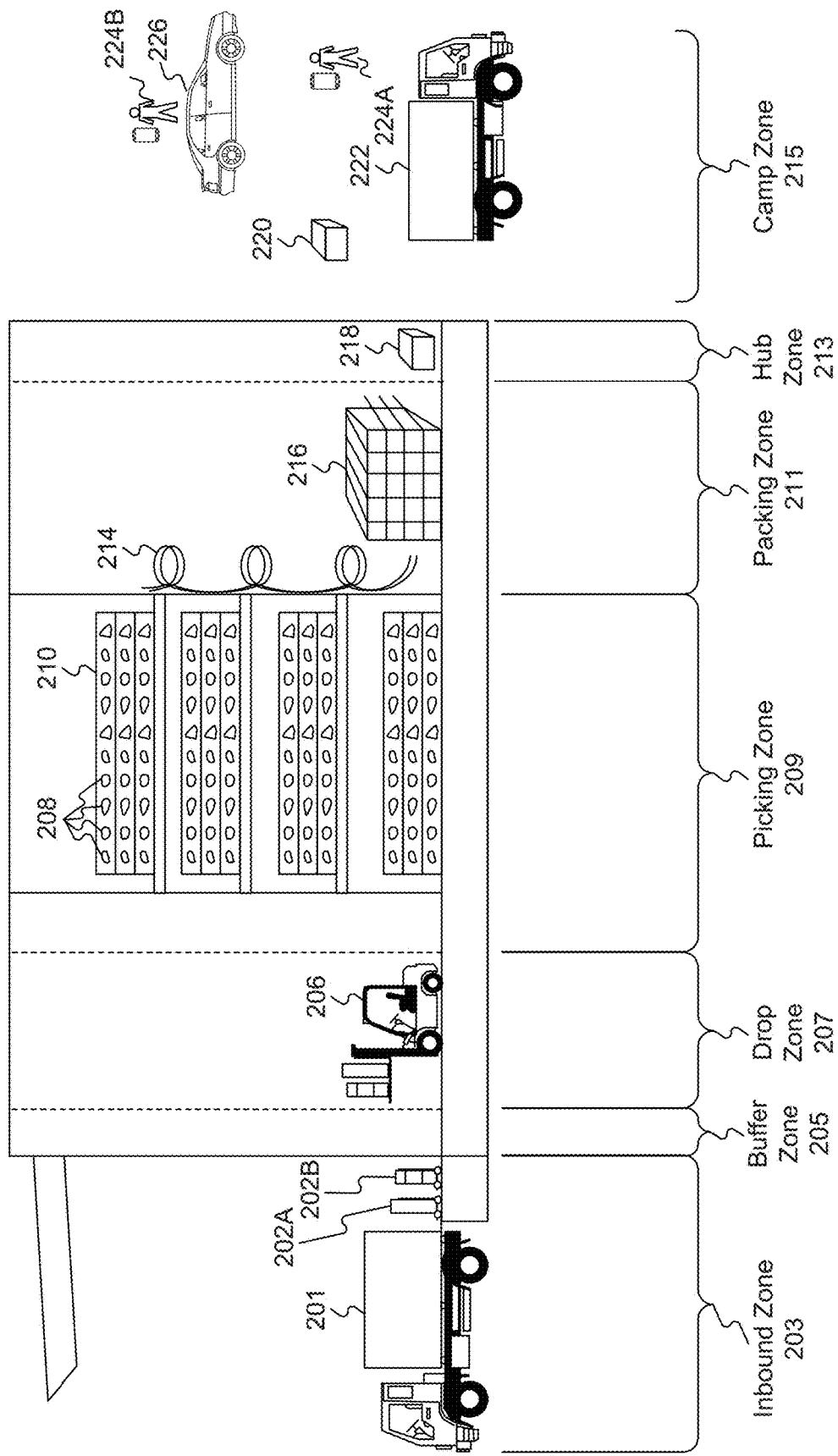
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119 6.

Once a user places an order, a picker may receive an instruction on device 119 6 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Workers in FC 200 may comprise direct workers and indirect workers. The direct workers may handle processes or tasks described above with respect to FIG. 2. For example, the processes may include, but not limited to, receiving items 202A and 202B in inbound zone 203, picking items 208 and 210 in picking zone 209, sorting items in FC 200, and packing delivery items 216 in packing zone 211. The indirect workers may handle miscellaneous tasks that do not involve handling items. For example, indirect workers may perform a safety inspection on machines associated with FC 200. Both workers punch in upon their arrivals at FC 200 and punch out when they leave FC 200. LMS 125 may receive and store attendance information associated with punch in and out as described above with respect to FIG. 1A. While both workers punch in/out, in some embodiments, only direct workers scan items.

Figure 3:
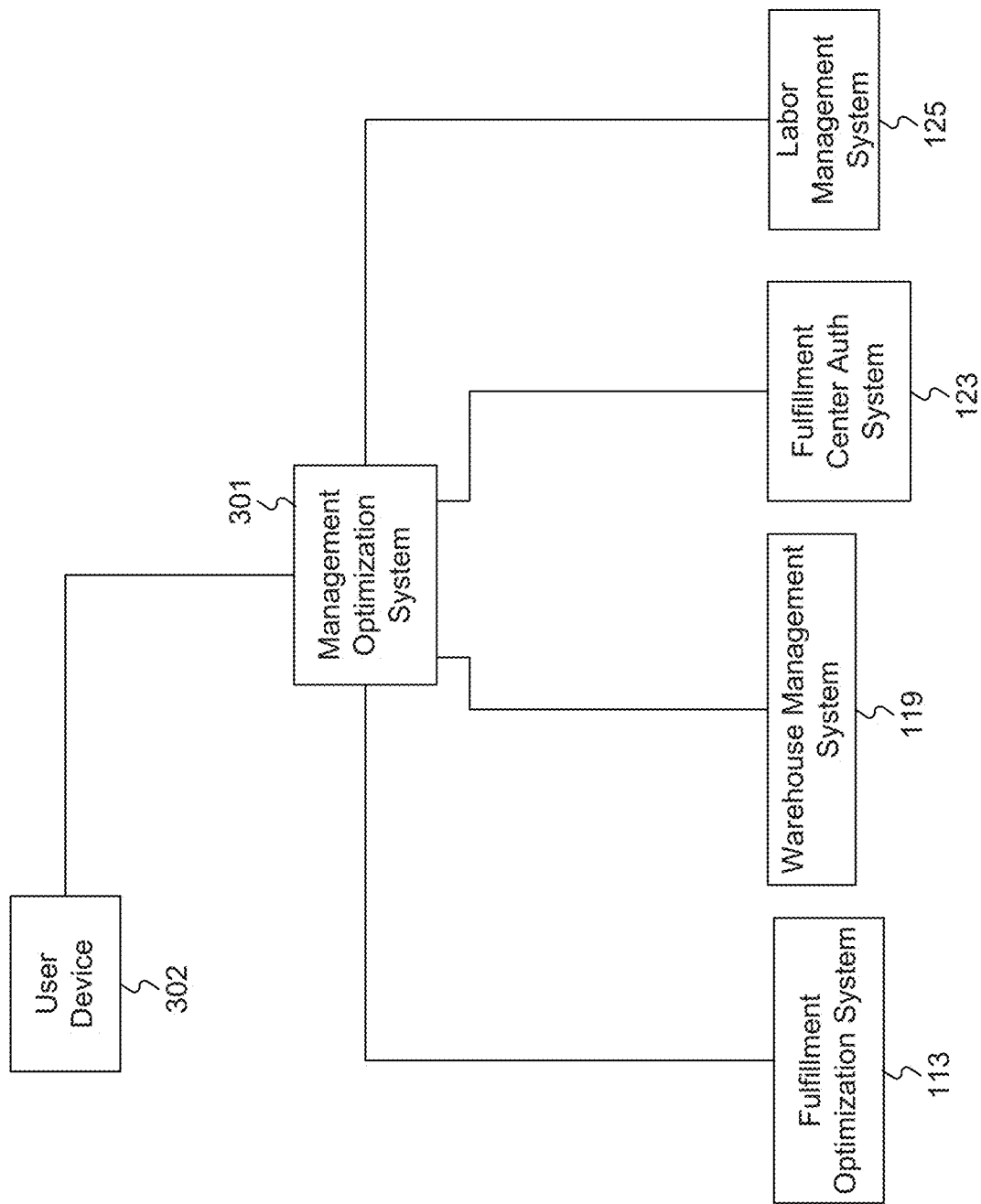
FIG. 3 is a schematic block diagram illustrating an exemplary embodiment of a network comprising computerized systems for monitoring logistics, consistent with the disclosed embodiments.

FIG. 3 is a schematic block diagram illustrating an exemplary embodiment of a network comprising computerized systems for monitoring logistics is shown. As illustrated in FIG. 3, system 300 may include a variety of systems, each of which may be connected to one another via one or more networks. The systems may also be connected to one another via a direct connection, for example, using a cable. The depicted systems include a manpower optimization system (MOS) 301, fulfillment optimization (FO) system 113, warehouse management system 119, mobile devices 119A, 119 6, and 119C (depicted as being inside of fulfillment center (FC) 200), fulfillment center authorization system (FC Auth) 123, and labor management system (LMS) 125.

In some embodiments, system 300 may implement LMS 125 to capture attendance and overtime information for a first plurality of workers. For example, as discussed above with respect to FIG. 1A, LMS 125 may be implemented as a computer system that stores attendance and overtime information for employees (including full-time and part-time employees). LMS 125 may provide the information to MOS 301 in the form of data.

Similarly, system 300 may implement WMS 119 to capture data identifying work performed by a second plurality of workers. The data may include, but not limited to, a location of performed work, an associated scan event, or clock-in information associated with each of a second plurality of workers. For example, as discussed above with respect to FIG. 1A, WMS 119 may be implemented as a computer system that monitors workflow. WMS 119 may receive event data from individual devices (e.g., devices 107A-107C or 119A-119C) indicating discrete events and store each event indicating a scan or a read of a package identifier in a corresponding database (not pictured) along with the package identifier, a time, date, location, user identifier, or other information, and may provide this information to MOS 301 in the form of data.

WMS 119, as discussed above with respect to FIG. 1A, may store information associating one or more devices with one or more users associated with system 100 and maintain a work log for each user associated with system 100. In some embodiments, WMS 119 may also receive check-in and check-out information from a timekeeping system, such as a timekeeping system operated on a device 119A-119C. WMS 119 may provide the stored information, the maintained work log and the information from the timekeeping system to MOS 301 in the form of data.

In addition, in some embodiments, system 300 may implement FC Auth 123 to capture work data related to a third plurality of workers. For example, as discussed above with respect to FIG. 1A, FC Auth 123 may be implemented as a computer system with a single-sign on (SSO) service, enabling users (e.g., employees) to associate themselves with a particular task, and configured to enable those employees to indicate what task they are performing and what zone they are in at different times of day. FC Auth 123 may aggregate information discussed above with respect to employees and provide the information to MOS 301 in the form of data.

In some embodiments, system 300 may implement FO 113 to capture order data and fulfillment center data. For example, as discussed above with respect to FIG. 1A, FO 113 may be implemented as a computer system that stores information for customer orders from other systems and information describing where particular items are held or stored. FO 113 may provide the stored information to MOS 301 in the form of data.

System 300, in some embodiments, may implement MOS 301. MOS 301 may consolidate the received data provided by at least one of LMS 125, WMS 119, FC Auth 123, and FO 113 on workers having corresponding data in one of the received sets of data. For example, MOS 301 may combine the received data, parse the combined data regarding workers, and order the data into profiles for individual workers or groups of workers.

MOS 301 may operate on the consolidated data to implement monitoring logistics tools. MOS 301 may provide a work performance, a work status, a number of workers in each process, a progress on reassignments of items inside fulfillment centers, attendance status showing abnormal attendance cases, a job distribution, a worker's activity history, an inventory transfer status, products order status, reports and details on shipment summary, fulfillment centers, PDD Miss Detail, and order tracking detail, and a delivery status in FCs, and identify trends in the work performance, an underperforming worker, and an underperforming work.

MOS 301, in some embodiments, may be configured to generate an interface for presentation to a user via a display device (e.g., user device 302). MOS 301 may render the data in a form ready for presentation and manipulation. MOS 301 may employ any components or subsystems appropriate for user interface generation, such as Java Script. In some embodiments, MOS 301 may employ AngularJS, Node.js, as a middleware HTTP server, D3.js, for highly customized, interactive visualizations, and/or any of a variety of other open source UI/UX engineering components such as Bootstrap, SASS, and Grunt.js.

User device 302 may be a tablet, computer, or any suitable device with computing capability which enable user device 302 to communicate with MOS 301. User device 302 may transmit a request for a visualization including analysis of the consolidated data to MOS 301. Upon receiving the request from user device 302, MOS 301 may provide a generated interface to user device 302, wherein the interface is generated by analyzing the consolidated data.

Figure 4:
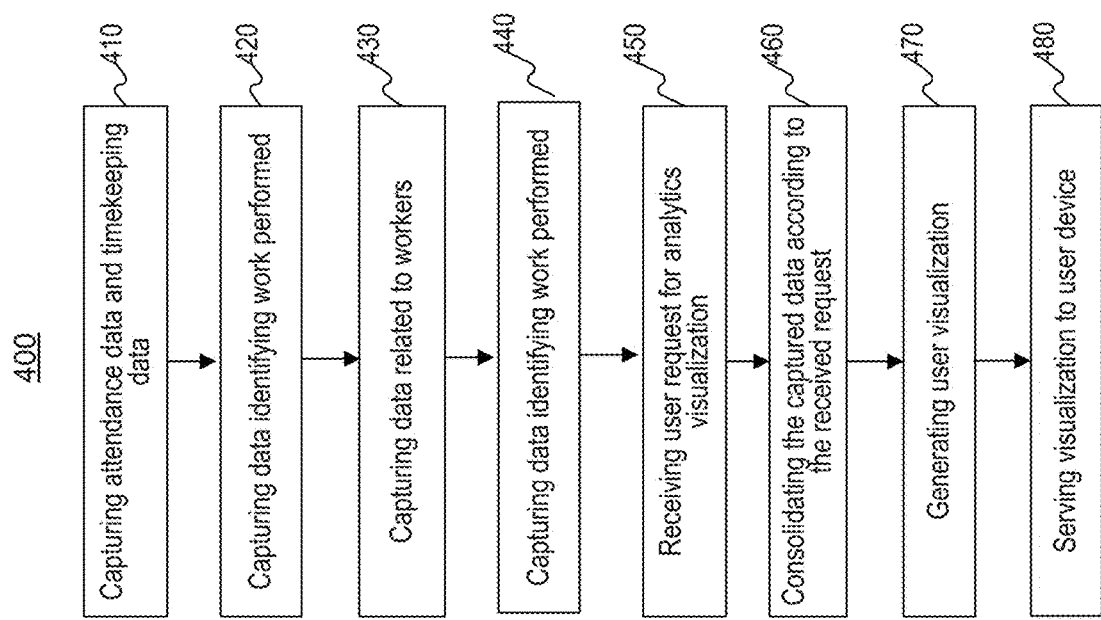
FIG. 4 is a flowchart of an exemplary process for processing data to monitor logistics, consistent with disclosed embodiments.

FIG. 4 is a flowchart of an exemplary process 600 for processing data to monitor logistics, consistent with the disclosed embodiments. With reference to FIG. 4, in step 410, MOS 301 may capture attendance data and timekeeping data for a first plurality of workers. MOS 301 may receive such data from LMS 126. In step 420, MOS 301 may also capture data identifying work performed by a second plurality of workers from WMS 119. The data may include, but not limited to, a location of performed work, an associated scan event, or clock-in information associated with each of a second plurality of workers. The performed work may comprise unloading an inbound item from a delivery truck, picking an inbound item, stowing an item, reassigning an item, and packing at least one delivery parcel inside a fulfillment center. The location of performed work is determined by receiving a location sent from an automated or handheld barcode scanner, a RFID reader, high-speed camera, or a device with communicating capacity.

In step 430, MOS 301 may capture work data related to a third plurality of workers from FC Auth 123. The data may comprise single-sign on (SSO) service information which indicates an association between a user and a particular task and tracking and checking-in information of temporary workers who do not scan any items and float from task to task. In step 440, MOS 301 may also capture order data and fulfillment center 200 related data from FO 113. The data may include customer order information and information describing where particular items are held or stored.

In step 450, MOS 301 may receive a user request for a visualization of analytics regarding any of the captured data obtained by MOS 301 from user device 302. The request may comprise a parameter identifying one or more categories for the one or more workers. For example, a manager in fulfillment center 200, using user device 302, may provide a request to MOS 301 to provide a visualization of analytics extracted from the captured data. The request may comprise a parameter including attendance associated with a worker and scan event associated with the worker.

In step 460, MOS 301 may consolidate the captured data from steps 410, 420, 430 and 440 on workers having corresponding data in one of the captured sets of data according to the parameter provided in step 450. For example, MOS 301 may combine the captured data according to a parameter provided by a user device. The parameter may comprise, as explained above but not limited to, attendance data associated with a worker and scan event associated with the worker. MOS 301 may parse the captured data regarding workers, and order the data into profiles for individual workers or groups of workers.

In step 470, MOS 301 may generate user visualization. MOS 301 may first operate on the consolidated data to produce a work performance, a work status, a number of workers in each process, a progress on reassignments of items inside fulfillment centers, attendance status showing abnormal attendance cases, a job distribution, a worker's activity history, an inventory transfer status, products order status, reports and details on shipment summary, fulfillment centers, PDD Miss Detail, and order tracking detail, and a delivery status in FCs, identify trends in the work performance, an underperforming worker, and an underperforming, and draw inferences. MOS 301 may render the result of this analysis in a form of presentation via a display device (e.g., user device 302) to user.

Figure 5A:
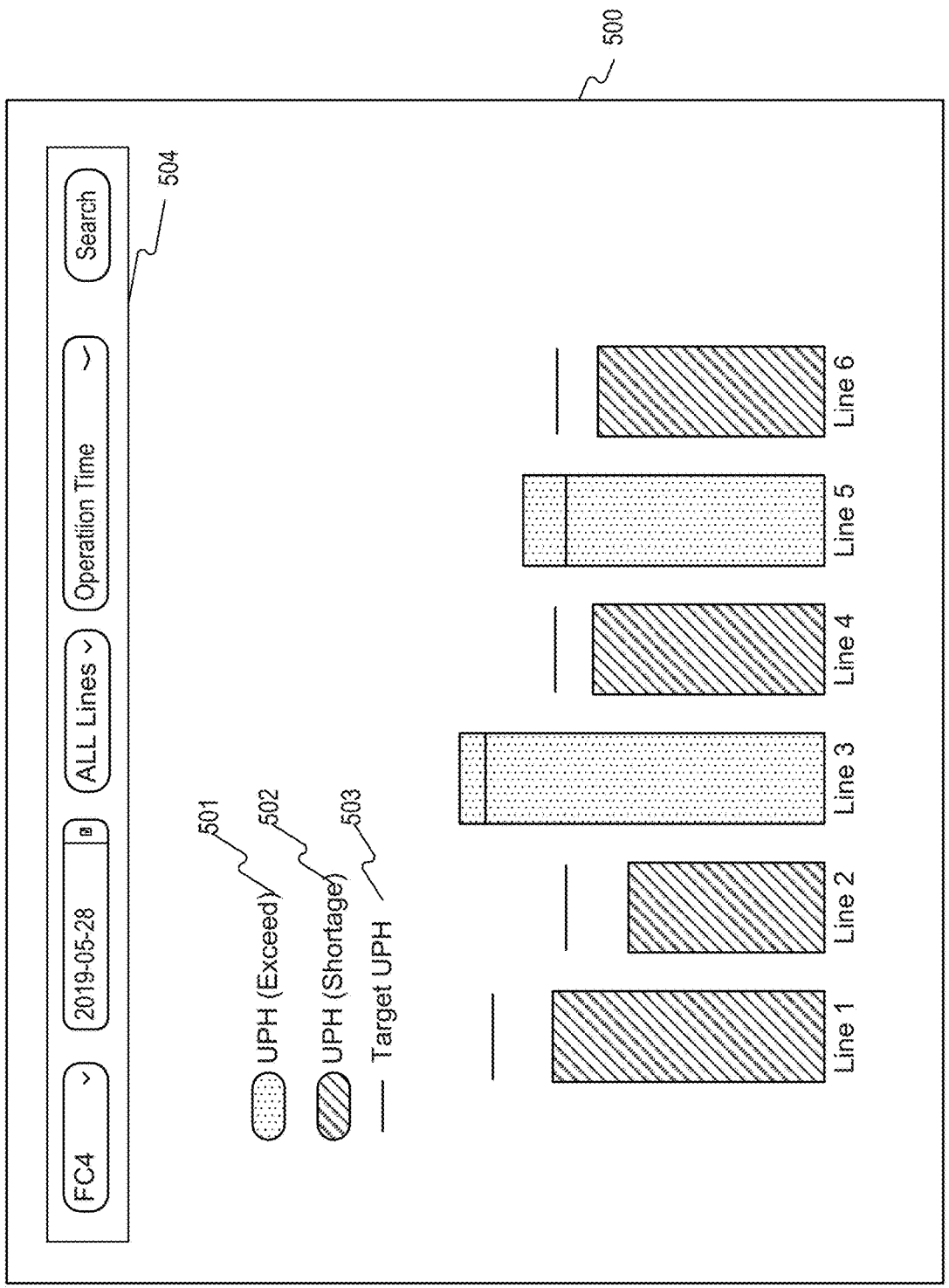
FIGS. 5A-O depict exemplary user interfaces for a monitoring logistics tool, consistent with the disclosed embodiments.

In step 480, MOS 301 may provide the visualization to the user device 302 for display. The exemplary visualizations are depicted in FIG. 5A-O. Upon receiving parameter for consolidating the captured data, MOS 301 may provide a user interface screen displaying analysis results for the consolidated data. A user may be able to select different views of the consolidated data (e.g., units handled by workers associated with each line per hour in FIG. 5A, packing status associated with a line in FIG. 5B, etc.). The user may also provide different parameters for MOS 301 to consolidate different types of data and provide an analysis results for the consolidated data.

FIGS. 5A-O depict exemplary user interfaces for a monitoring logistics tool. With reference to FIGS. 5A-O, in some embodiments, a user device 302 may execute a browser application capable of presenting various types of interactive content for a user. MOS 301 may be configured to generate interface depicted in FIGS. 5A-O as a part of step 470 of process 400.

As shown in FIG. 5A, interface 500 may provide a performance of each line within fulfillment center 200 by showing units per hour (UPH) each line handled, wherein the line is composed of group of workers performing same task. For example, an indicator 501 may present a line exceeding the target 503 and an indicator 502 may present a line failing to meet the target 503 by graphical presentation. The task may include packing, picking, and rebinning (reassigning) of items within the fulfillment center 200.

In some embodiments, exemplary interface 500 may enable user device 302 to provide parameters by using a search bar 504 for MOS 301 to consolidate data associated with the provided parameters and provide an analysis results for the consolidated data. The search bar 504 may enable user device 302 to configure a fulfillment center, a date, a line, and an operation time for consolidating associated data.

Figure 5B:
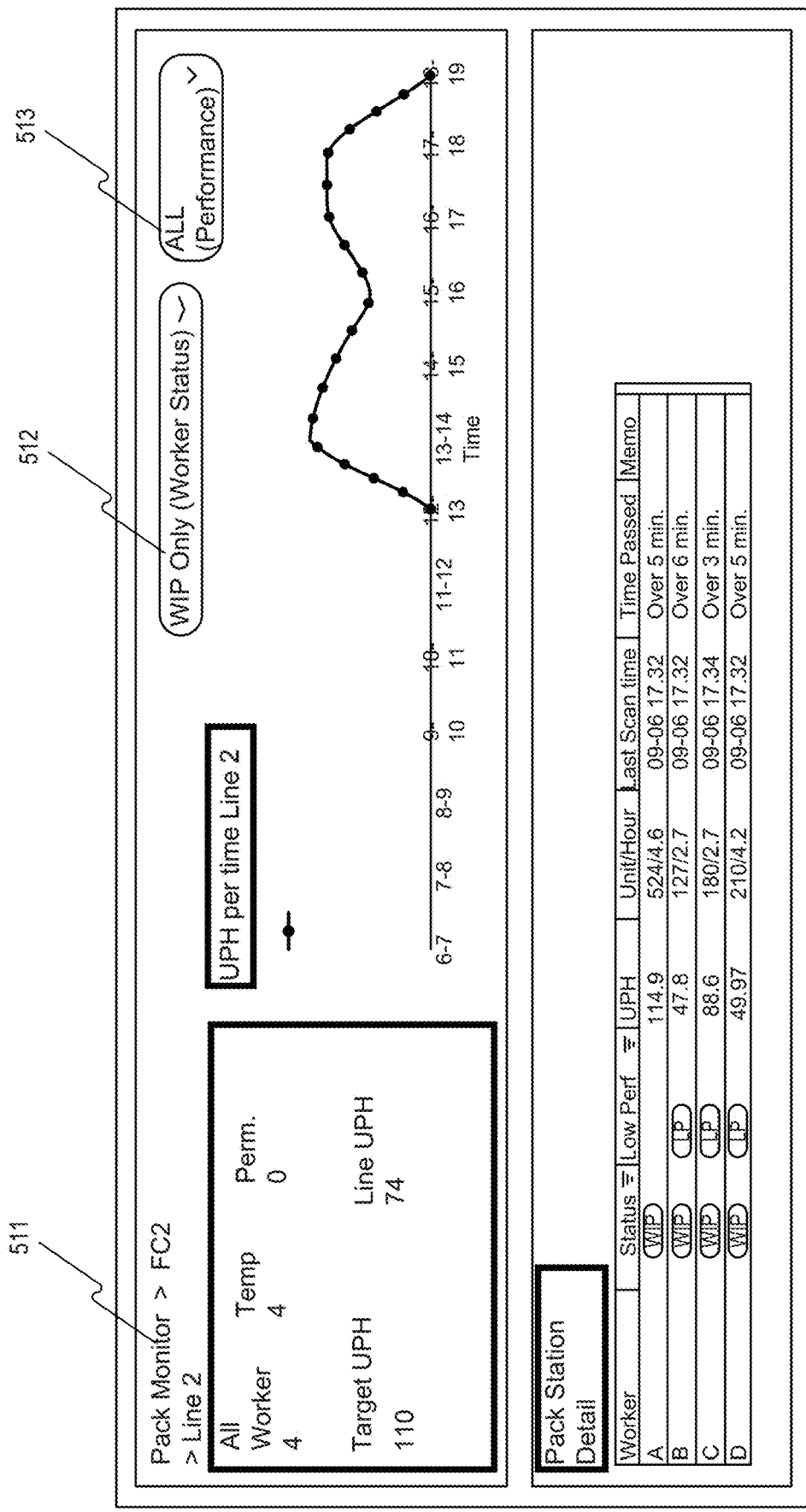

FIG. 5B depicts another interface 510 which provides current status of workers assignments in each line, an UPH trend by time, and detailed status of packing station. The current status provides a number of total workers, a number of temporary workers, a number of permanent workers, a target UPH, and a current UPH of a line. The UPH trend is depicted in the form of graph. The detailed status of packing station provides workers assigned in the packing station, status of each worker, a performance of each worker, an UPH of each worker, a last time a worker scanned an item, and an elapsed time since a worker scanned the last item. FIG. 5B is described with respect to packing but one of ordinary skill will understand that similar interface can be generated for other tasks (e.g., picking).

In some embodiments, exemplary interface 510 may enable user device 302 to provide parameters by using a filter 511 for MOS 301 to consolidate data associated with the provided parameters and provide an analysis results for the consolidated data. The filter 511 may enable user device 302 to configure a task (e.g., packing or picking), a fulfillment center, and a line within the fulfillment center. For example, exemplary interface 510 depicts current and detailed status of packing by Line 2 within FC2.

In some embodiments, exemplary interface 510 may enable user device 302 to filter workers in a line by their status by using a dropdown box 512 for MOS 301 to consolidate data associated with filtered workers. The dropdown box 512 may provide the status of Moved, WIP, and ALL for workers for the user device 302 to select. The Moved status represents a worker previously worked in the current station (e.g., Pack Station in the exemplary interface 510) but currently works in another station or other task. The WIP status represents a worker currently working in the current station (e.g., Pack Station in the exemplary interface 510), and the ALL status includes workers with WIP or Moved status. MOS 301 may consolidate data associated a selected status of workers (e.g., WIP in the exemplary interface 510) when MOS 301 receives the status of a worker, for example, MOS 301 may determine a status of worker based on punch out information associated with a worker.

In some embodiments, exemplary interface 510 may enable user device 302 to filter workers in a line by their performance level by using a dropdown box 513 for MOS 301 to consolidate data associated with filtered workers. The dropdown box 513 may provide the performance level of Low Performance and ALL for workers for the user device 302 to select. The Low Performance represents a worker whose UPH is under the target UPH (e.g., Worker B, C, and D in the exemplary interface 510), and the ALL represents all workers in the line regardless of their performance level (e.g., workers A, B, C, and D). MOS 301 may consolidate data associated a selected performance level of workers (e.g., ALL in the exemplary interface 510) when the MOS 301 receives the performance level of a worker for filtering.

Figure 5C:
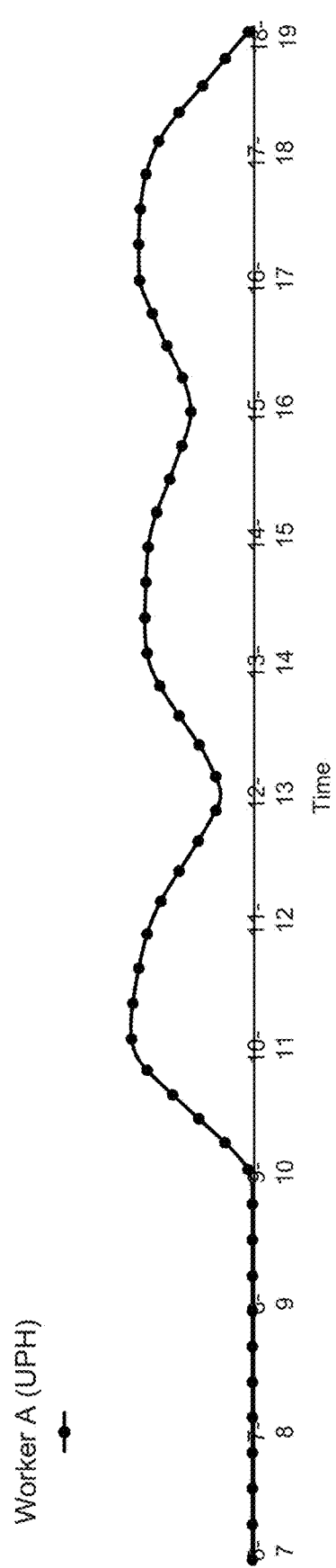
Figure 5D:
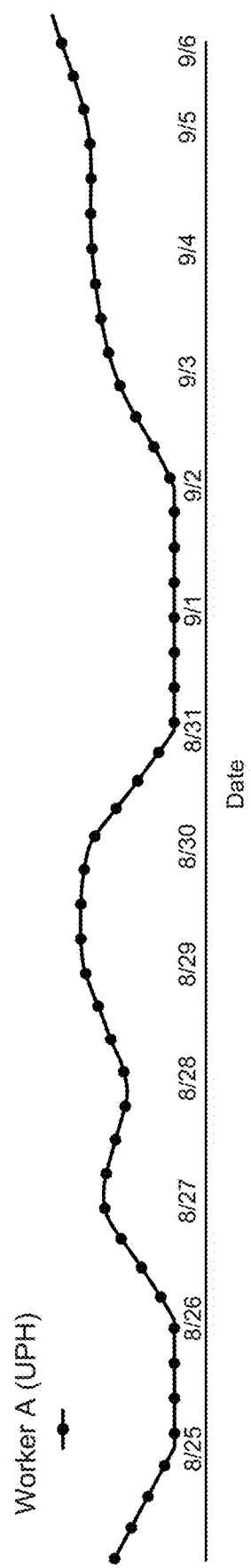

FIG. 5C depicts a worker's average UPH on an hourly basis and FIG. 5D depicts a worker's UPH over the past two weeks. The UPH provided in FIG. 5C and FIG. 5D may provide a performance of a worker, over a specific date (FIG. 5C) or over past two weeks (FIG. 5D), to a manager associated with the worker. In some embodiments, MOS 301 may provide one or more UPHs associated with one or more workers in the same manner presented by FIGS. 5C-D to user device 302.

Figure 5E:
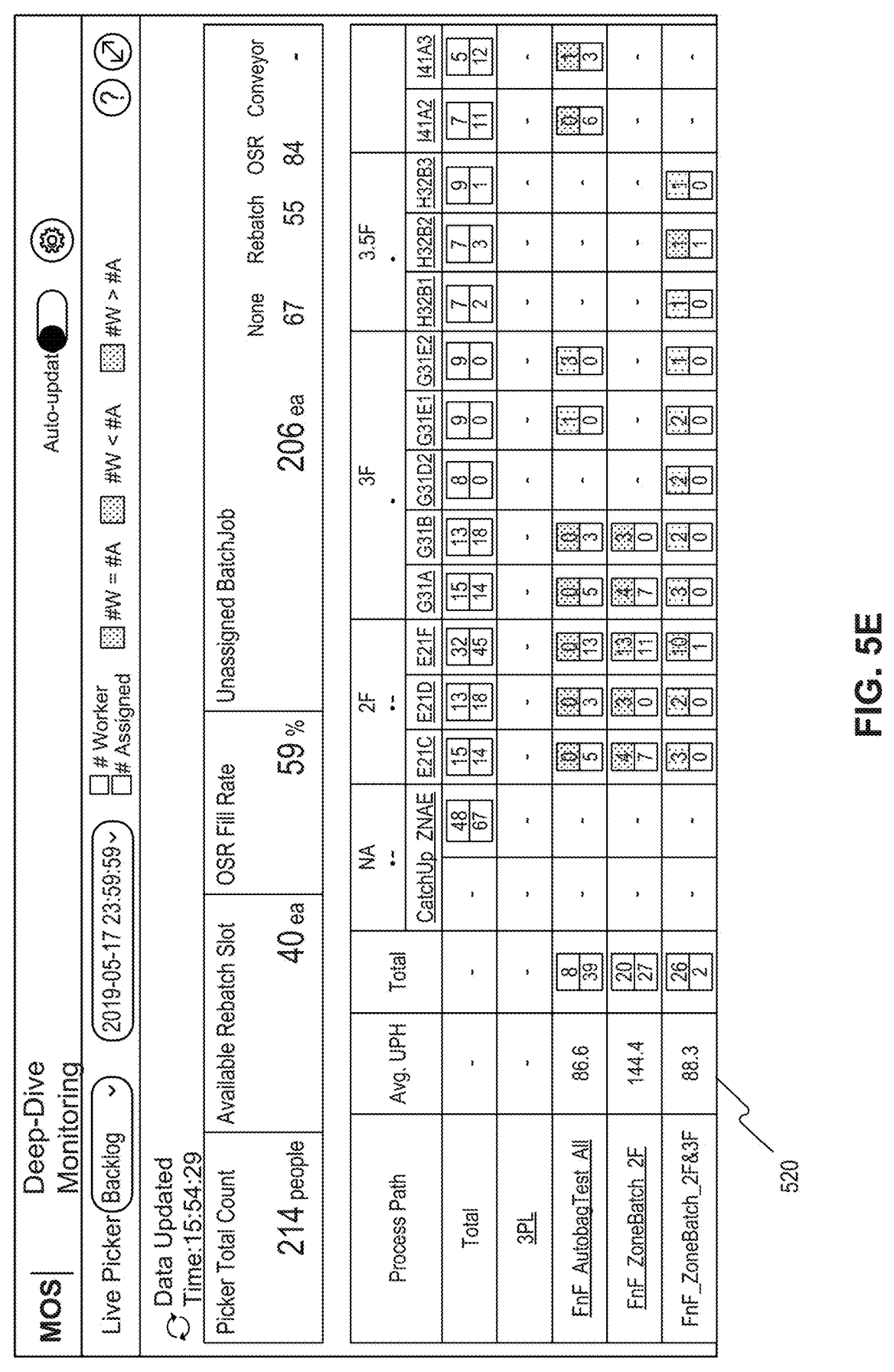

FIG. 5E depicts another interface 520 which provides current status of picking process (picking is described above with respect to picking zone 209 in FIG. 2) within FC 200. The interface 520 provides workers assignments for each process within a location in FC. For example, if excessive worker is assigned to a process, interface 520 may alert a user by presenting an indicator with different color on a process and its exact location. The interface 520 is updated based on real-time data. For example, when a worker scans an item in a picking zone, WMS 119 may transmit data associated with the scan event to MOS 301, and MOS 301 may update interface 520 accordingly.

Figure 5F:
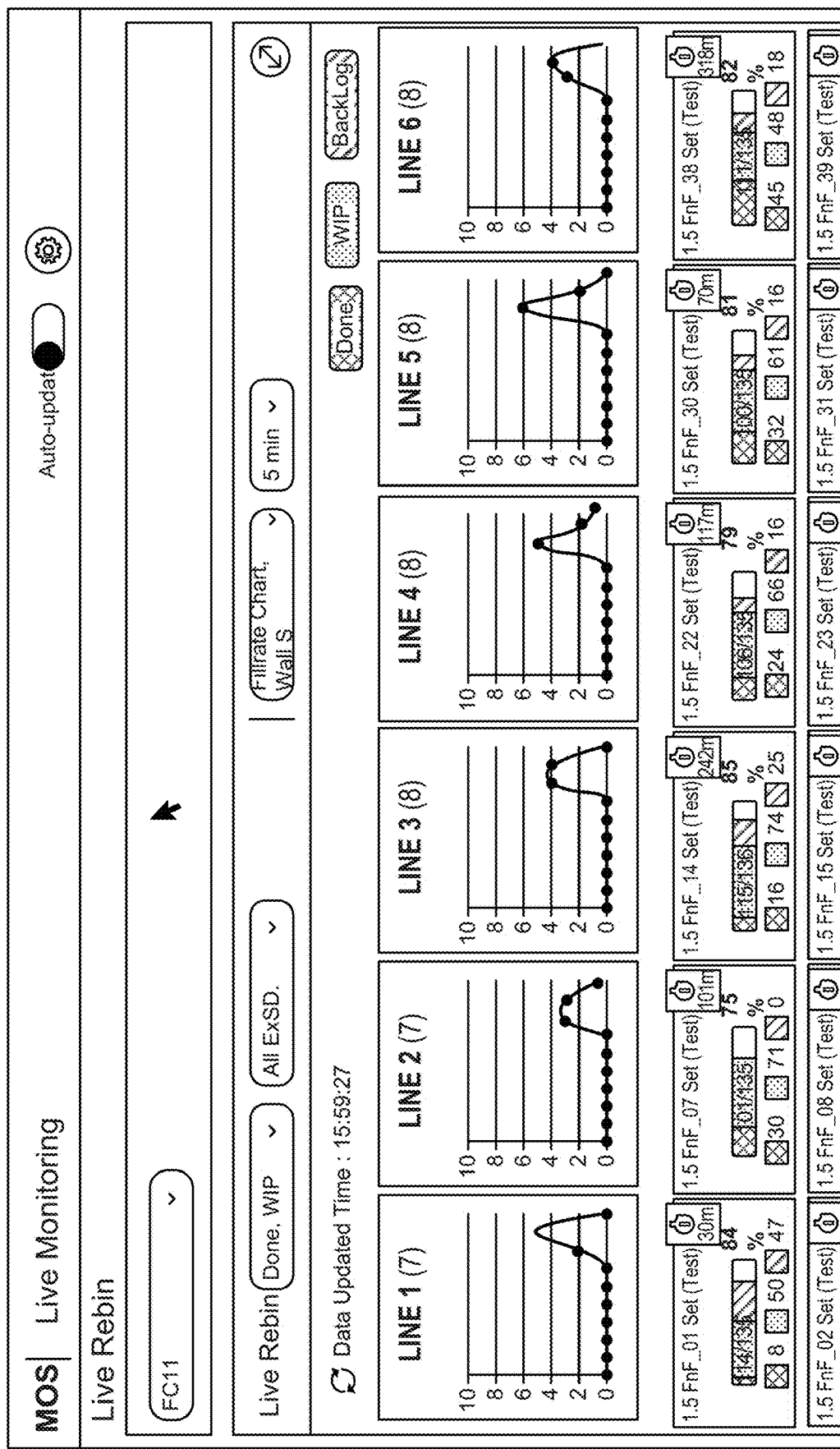

FIG. 5F depicts another interface 530 which provides current status of reassignment of items (Rebin) stored in FC. Interface 530 may present ratios of completed reassignments, ongoing reassignments, and backlogged reassignments. Interface 530 may also present a progress on reassignments in time in the form of graphs. The interface 530 is updated based on real-time data. For example, when a worker scans an item to rebin the item within FC 200, WMS 119 may transmit data associated with the scan event to MOS 301, and MOS 301 may update interface 530 accordingly. The interface 530 may also provide filters for user device 302 to configure parameters for MOS 301 to consolidate data based on the configurations.

FIG. 5G depicts another interface 540 which provides a work process log of a worker over a predefined time period. MOS 301 may generate the interface 540 by combining attendance data and data associated with at least one scan event. The log provides all of worker's history including an employee ID, a name, punch in/out times, scanning events, a work type (process), a location, a start time and an end time for each event, and a number of units associated with each event. The interface 540 may also provide filters for user device 302 to configure parameters for MOS 301 to consolidate data based on the configurations.

Figure 5H:
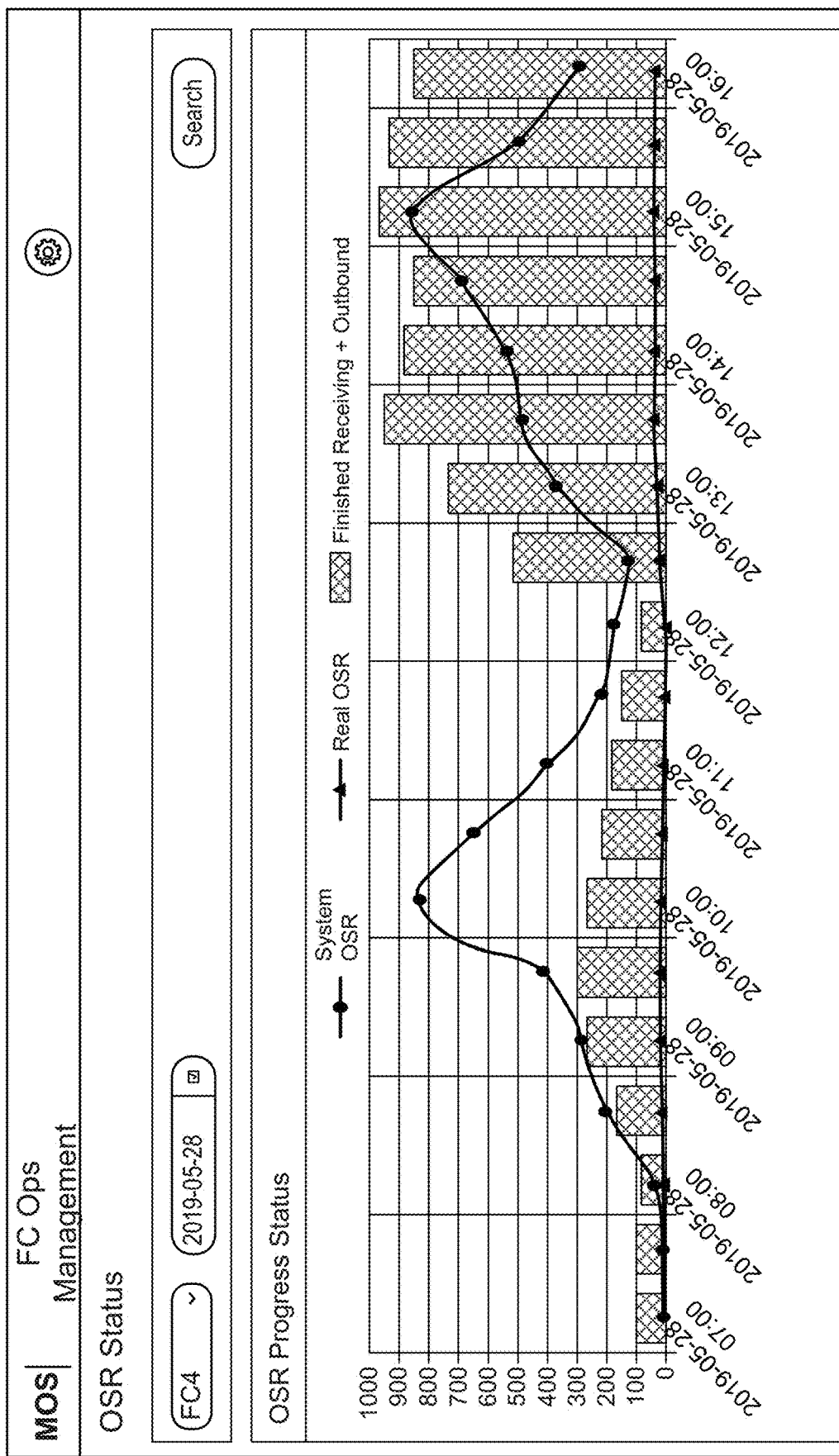

FIG. 5H depicts another interface 541 which provides open space ratio (OSR) progress status. The OSR progress status may trigger monitoring and control of reassignment and backlog. Based on the status, a worker associated with user device 302 may manually increase the number of reassignment slots and assign more workers to enhance the throughput. The interface 541 may also provide filters for user device 302 to configure parameters for MOS 301 to consolidate data based on the configurations.

FIG. 5I depicts another interface 545 which provides PDD miss details in camps. The details may comprise a reason for the PDD miss and a number of miss over time. The interface 545 may also provide filters for user device 302 to configure parameters for MOS 301 to consolidate data based on the configurations.

Figure 5J:
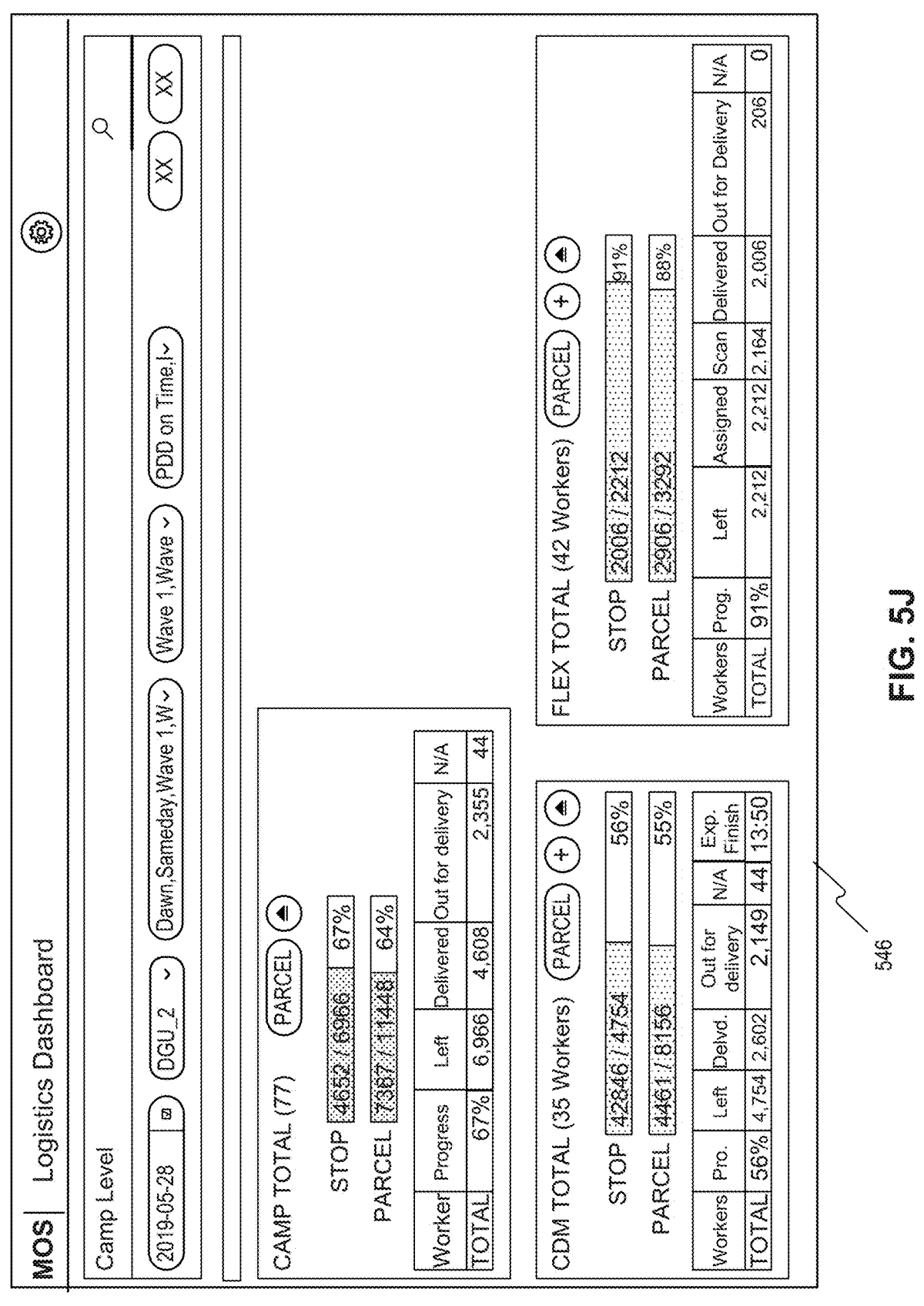

FIG. 5J depicts another interface 546 which provides delivery status in a camp. The status show how delivery tasks are assigned between permanent workers (CDM) and temporary workers (FLEX) within a camp and provide a progress, a number of undelivered items, a number of delivered items, a number of items out for delivery and a number of items that cannot be delivered (N/A). For the permanent workers, interface 508 may present expected delivery finish time.

Figure 5K:

FIG. 5K depicts another interface 550 which provides attendance status and details of abnormal attendance status in FC 200. MOS 301 may generate the interface 550 by combining attendance data and data associated with at least one scan event. MOS 301 may also use information associated with punch in or information associated with a worker provided by LMS 125. The status may provide the exact number of abnormal attendance cases and the corresponding employees. The abnormal attendance status cases are determined when a worker is associated with no work log and no punch in. For example, a worker is not expected to have a punch out time when the worker is not associate with a punch in time.

Figure 5L:
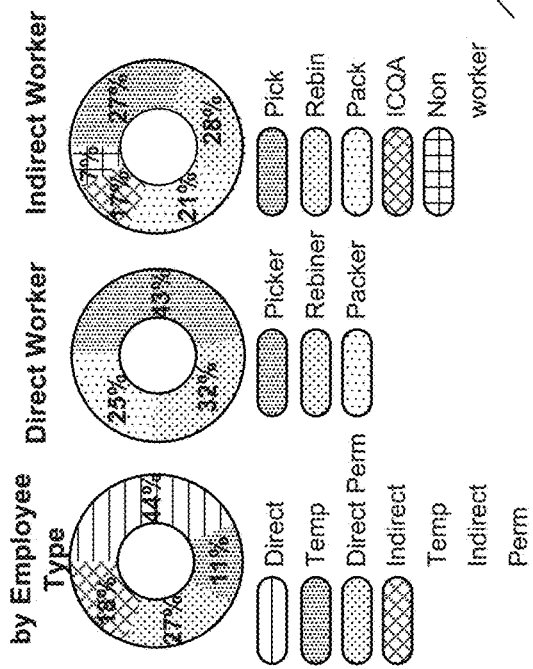

FIG. 5L depicts another interface 560 which provides a job distribution in FC 200. The job distribution may provide how many workers are currently allocated to each process that would lead to better labor planning. MOS 301 may generate the interface 560 by using at least one of data associated with at least one scan event, information associated with punch in, or information associated with a worker provided by LMS 125.

FIG. 5M depicts another interface 570, monitoring a line associated with packing items. Interface 570 may provide, the current number of packers in each line, a manager of each line, an hourly trend of gross UPH by lines, and an underperforming line determined by a comparison against a target UPH.

Figure 5N:
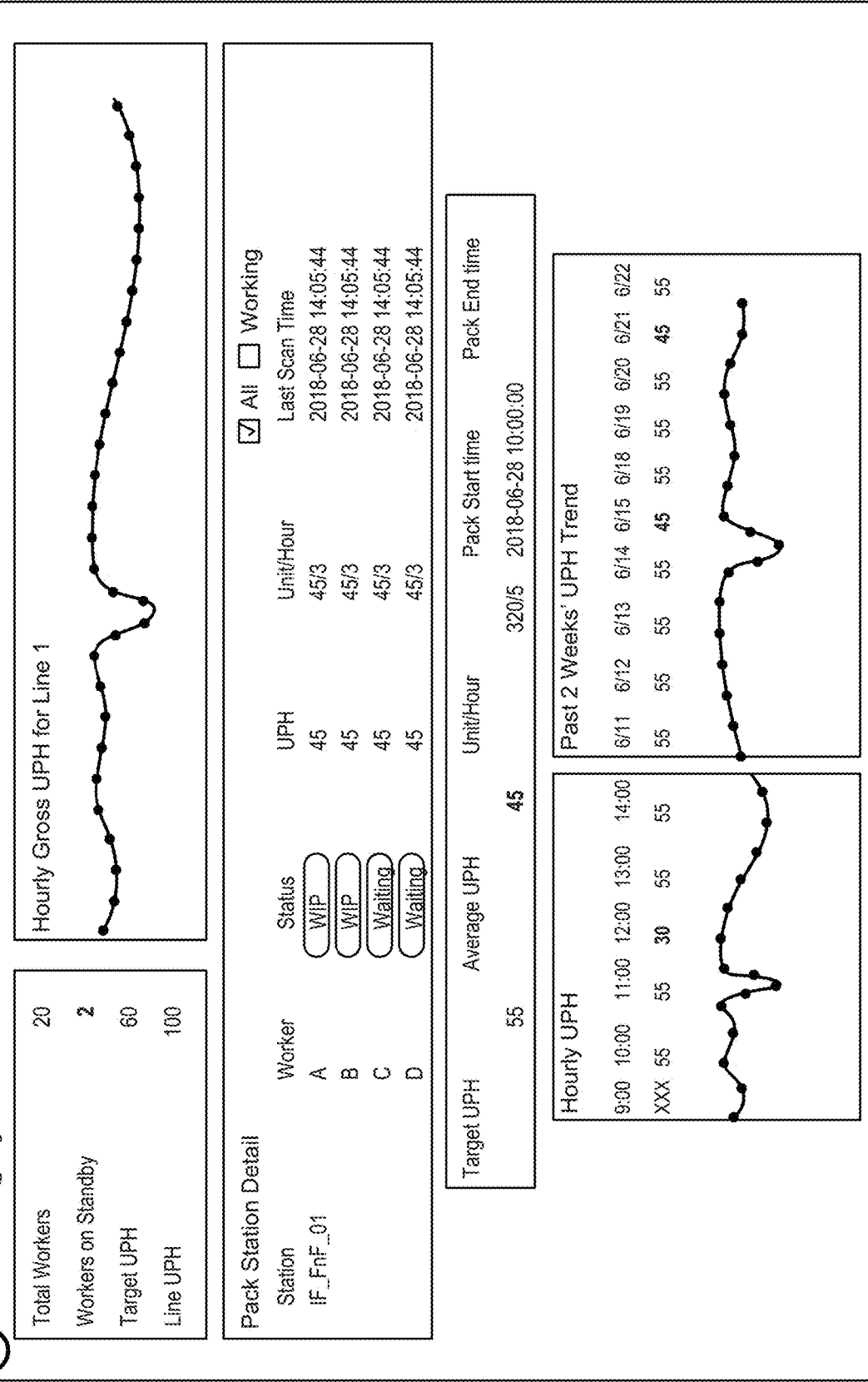
Figure 5O:
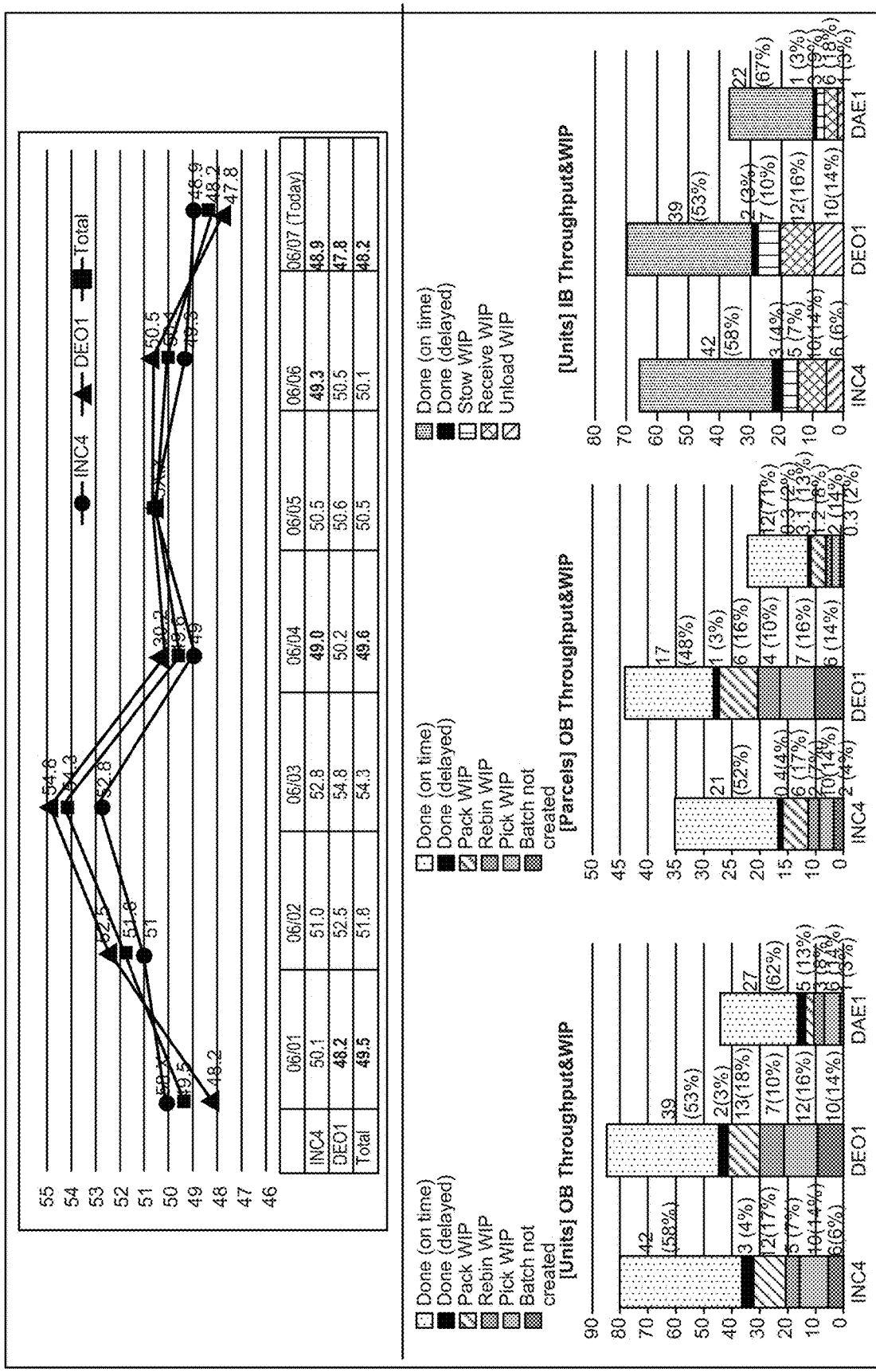

FIG. 5N depicts another interface 580, monitoring workers in a line associated with packing items. Interface 580 may provide, a total number of workers assigned to the line, a number of standby workers, and a performance of workers in each line. Interface 580 may also highlight a non-working worker or underperforming worker and notify a manager associated with the highlighted worker.

FIG. 5O depicts another interface 590, which provides gross UPH trend and work status of a day. The Gross UPH trend report may help a user to easily pinpoint the current state of FC 200. The metrics are based on a unified standard that FC 200 and a finance team associated with FC 200 can rely on the report. The work status of a day report may provide percentage of work completed on time, completed but not one time, and incomplete works in real-time. The report may provide a signal to re-allocate workers in a day. For example, if a task is heavily weighted with incomplete works when it was compared to other tasks, then MOS 301 may provide a signal to re-allocate workers to ease the heavy weighted task.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:
1. A computer-implemented system for monitoring logistics comprising:
   a memory storing instructions; and
   at least one processor configured to execute the instructions for:

capturing a set of data comprising attendance data and timekeeping data for a first plurality of workers;

capturing a set of data identifying work performed by a second plurality of workers;

capturing a set of work data related to a third plurality of workers;

receiving a first request for monitoring logistics from a user device based on specific search criteria, wherein the specific search criteria includes a first parameter;

consolidating the captured data for one or more of the first plurality of workers, one or more of the second plurality of workers, or one or more of the third plurality of workers according to the first parameter;

filtering the consolidated data by a second parameter; and providing a visualization to the user device, wherein the visualization is generated by analyzing the consolidated captured data.

2. The computer-implemented system of claim 1, wherein the instructions further comprise notifying a mobile device associated with a manager of an underperforming worker based on the consolidated captured data.

3. The computer-implemented system of claim 1, wherein the work performed comprises unloading an inbound item from a delivery truck, picking an inbound item, stowing an item, reassigning an item, or packing at least one delivery parcel inside a fulfillment center.

4. The computer-implemented system of claim 1, wherein a location of work performed is determined by receiving a location sent from an automated or handheld barcode scanner, a RFID reader, high-speed camera, or a device with communicating capacity.

5. The computer-implemented system of claim 1, wherein providing the visualization further comprises providing an activity history associated with a plurality of workers by analyzing the consolidated captured data.

6. The computer-implemented system of claim 1, wherein the at least one processor is further configured to execute the instructions for:

capturing a set of order data and fulfillment center data;

receiving a second request, the second request including a second parameter identifying one or more categories;

consolidating the captured data for a selected plurality of workers having corresponding data in one of the captured sets of data according to the second parameter;

reassigning the selected plurality of workers on underperforming tasks, each underperforming task being determined by reassignment data, wherein the reassignment data is generated from the consolidated captured data.

7. The computer-implemented system of claim 1, wherein providing the visualization further comprises:

determining abnormal attendance status by combining an identity of a worker associated with the work data and an associated scan event from the consolidated captured data; and providing the identity of the worker with an abnormal attendance status.

8. The computer-implemented system of claim 1, wherein providing the visualization further comprises providing a performance of each fulfillment center, wherein the performance is determined by combining a number of scan events, attendance data, and timekeeping data from the consolidated captured data, and defined by how many units were handled by workers associated with each fulfillment center over an hour.

9. The computer-implemented system of claim 8, wherein the provided performance of each fulfillment center presents a trend in the performance over time.

10. A computer-implemented method for monitoring logistics comprising:

capturing a set of attendance data and timekeeping data for a first plurality of workers;

capturing a set of data identifying work performed by a second plurality of workers;

capturing a set of work data related to a third plurality of workers;

receiving a first request for monitoring logistics from a user device based on specific search criteria, wherein the specific search criteria includes a first parameter;

consolidating the captured data for one or more of the first plurality of workers, one or more of the second plurality of workers, or one or more of the third plurality of workers having corresponding data in one of the captured sets of data according to the first parameter;

filtering the consolidated data by a second parameter; and providing a visualization to the user device, wherein the visualization is generated by analyzing the consolidated captured data.

11. The method of claim 10, further comprising:

notifying a mobile device associated with a manager of an underperforming worker based on the consolidated captured data.

12. The method of claim 10, wherein the work performed comprises unloading an inbound item from a delivery truck, picking an inbound item, stowing an item, reassigning an item, or packing at least one delivery parcel inside a fulfillment center.

13. The method of claim 10, wherein a location of work performed is determined by receiving a location sent from an automated or handheld barcode scanner, a RFID reader, high-speed camera, or a device with communicating capacity.

14. The method of claim 10, wherein providing the visualization further comprises providing an activity history associated with a plurality of workers by analyzing the consolidated captured data.

15. The method of claim 10, wherein the operations further comprise:

capturing a set of order data and shipment data;

receiving a second request, the second request including a second parameter identifying one or more categories;

consolidating the captured data for a selected plurality of workers having corresponding data in one of the captured sets of data according to the second parameter; and reassigning the selected plurality of workers on underperforming tasks, each underperforming task being determined by reassignment data, wherein the reassignment data is generated from the consolidated captured data.

16. The method of claim 10, wherein providing the visualization further comprises:

determining abnormal attendance status by combining an identity of a worker associated with the work data and an associated scan event from the consolidated data; and providing the identity of the worker with an abnormal attendance status.

17. The method system of claim 10, wherein providing the visualization further comprises providing a performance of each fulfillment center, wherein the performance is determined by combining a number of scan events, attendance data, and timekeeping data from the consolidated data, and defined by how many units were handled by workers associated with each fulfillment center over an hour.

18. The method of claim 17, wherein the provided performance of each fulfillment center presents a trend in the performance over time.

\* \* \* \* \*